(12) United States Patent
Mackay et al.

(10) Patent No.: US 7,578,547 B1
(45) Date of Patent: Aug. 25, 2009

(54) MEMBER FOR PREVENTING OIL CANNING OF A PANEL IN A VEHICLE

(75) Inventors: Allyn R. Mackay, Grosse Pointe, MI (US); Thomas M. Larocca, Shelby Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/101,511

(22) Filed: Apr. 11, 2008

(51) Int. Cl.
*B62D 25/10* (2006.01)
(52) U.S. Cl. ............... 296/191; 296/181.1; 296/187.03; 296/193.01
(58) Field of Classification Search .................. 296/191, 296/186.1, 187.03, 187.04, 187.09, 187.1, 296/187.11, 187.12, 193.01, 193.05, 193.06, 296/193.08, 193.09, 198
See application file for complete search history.

(56) References Cited

U.S. PATENT DOCUMENTS 5,605,371 A * 2/1997 Borchelt et al. ........ 296/187.09

* cited by examiner

*Primary Examiner*—Joseph D Pape
(74) *Attorney, Agent, or Firm*—Quinn Law Group, PLLC

(57) ABSTRACT

A support system includes a first panel and a second panel spaced from the first panel. The first panel defines an opening and includes a rim which surrounds the opening. A member is disposed between the panels. The member is attached to the first panel and provides support to the second panel to prevent the second panel from "oil canning" or flexing toward the first panel. The member includes a base, a first leg, and a second leg. A retaining feature is disposed on each of the legs which engages the rim of the first panel. While the retaining feature engages the rim of the first panel, the base supports the second panel such that the second panel is prevented from flexing toward the first panel.

20 Claims, 2 Drawing Sheets

MEMBER FOR PREVENTING OIL CANNING OF A PANEL IN A VEHICLE

TECHNICAL FIELD

The invention relates to a member for supporting a pair of panels in a vehicle to prevent oil canning of one of the panels.

BACKGROUND OF THE INVENTION

A vehicle body is typically assembled from panels formed from sheet metal or other similar material. A body panel is typically formed from an inner panel, which provides structure, and another panel, which forms part of the exterior surface of the body. The inner and outer panels are in spaced relationship and attached to one another along a perimeter of the panels. The panel can exhibit a phenomenon known by those skilled in the art as "oil canning", which occurs when the outer panel flexes inward, toward the inner panel, and back out, away from the inner panel. The resultant noise is similar to the sound produced by an oil can. To avoid oil canning, various reinforcements may be used.

SUMMARY OF THE INVENTION

A member for supporting a first panel relative to a second panel in a vehicle is provided. The member includes a base for supporting the second panel. A first leg resiliently extends from the base to a first end. A second leg resiliently extends in spaced relationship to the first leg from the base to a second end. A first retaining feature is disposed at the first end and a second retaining feature is disposed at the second for engaging the first panel to retain the member to the first panel. The ends move toward one another upon application of a force to each of the legs to attach the member to the first panel. The ends move apart as the force is reduced to retain the member to the first panel.

A support system for a vehicle body is provided. The support system includes a first panel defining an opening and a second panel. The first panel includes a rim which surrounds the opening. The second panel is in spaced relationship to the first panel. A member is disposed between the panels and the member reacts between the panels. The member includes a base, a first leg that resiliently extends from the base to a first end, and a second leg that resiliently extends in spaced relationship to the first leg from the base to a second end. A first retaining feature is disposed at the first end and a second retaining feature is disposed at the second end. Each of the retaining features engages the rim of the first panel. The base supports the second panel such that the second panel is prevented from flexing toward the first panel, proximate the base.

A method of assembling a body panel of a vehicle is provided. The method includes applying a force to each of a first leg and a second leg of a member to move retaining features, disposed at ends of the legs, toward one another. The retaining features are placed into an opening that is defined in a first panel of the vehicle. The retention features of the member are aligned with a rim that surrounds the opening of the first panel. The force applied to the legs is released such that the retention features engage the rim of the first panel and retain the member to the first panel.

Accordingly, a member having resilient legs with retaining features allows for improved installation of the member between opposing panels of the vehicle body. The installation is improved by allowing the member to be installed by hand, typically without the use of insertion tools. Additionally, because the retaining features engage the first panel, the formation of a tab on one of the panels is not required.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike.

DESCRIPTION OF THE PREFERRED EMBODIMENTS

Figure 1:
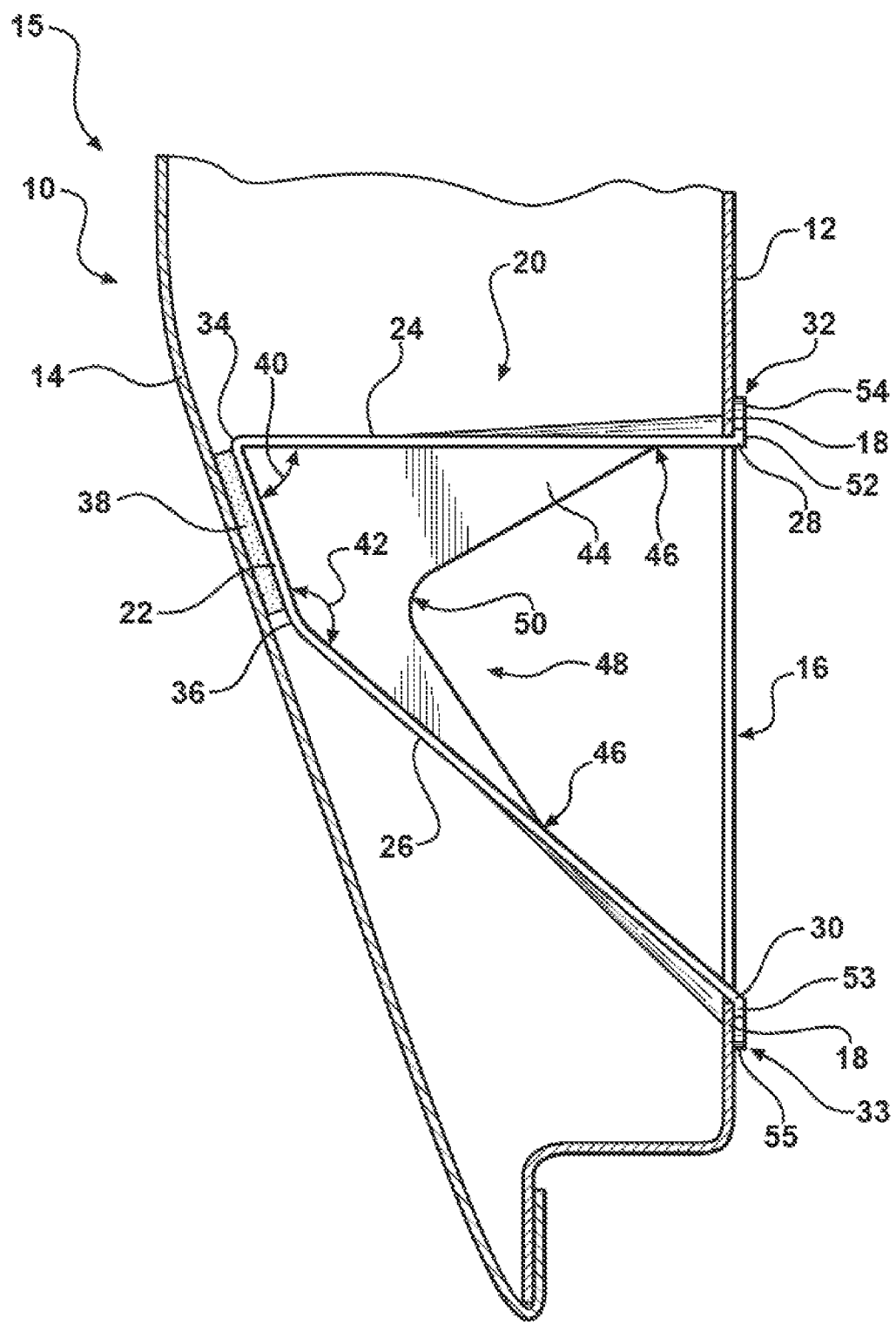
FIG. 1 is a cross-sectional side view of a support system including a first panel and a second panel with a member attached to the first panel for supporting the first panel relative to the second panel.

Referring to the drawings, wherein like reference numbers refer to like components, FIG. 1 shows a support system 10. The support system 10 includes a first panel 12 and a second panel 14 in spaced relationship to the first panel 12. The panels 12, 14 are disposed on a vehicle, and are operatively connected to one another to define a body panel 15, such as a side door, hood, decklid, etc. In the present embodiment, the first panel 12 is an inner panel and the second panel 14 is an outer panel. However, it should be appreciated that the first panel 12 is not limited to being an inner panel and the second panel 14 is not limited to being an outer panel. The first panel 12 defines an opening 16 and includes a rim 18 which surrounds the opening 16. A member 20 is disposed between the panels 12, 14. The member 20 provides structural support to the second panel 14 by reacting between the panels 12, 14 to prevent the second panel 14 from "oil canning" or flexing toward the first panel 12.

The member 20 is formed from any type of plastic material, such as ABS plastic, etc. However, the member 20 is not limited to being formed from plastic material as any other suitable material known to those skilled in the art may also be used. Referring generally to the Figures, the member 20 includes a base 22, a first leg 24, and a second leg 26. The first leg 24 resiliently extends from the base 22 to a first end 28 and the second leg 26 resiliently extends from the base 22, in spaced relationship to the first leg 24, to a second end 30. A first retaining feature 32 is disposed at the first end 28 and a second retaining feature 33 is disposed at the second end 30. Referring again to FIG. 1, each retaining feature 32, 33 engages the rim 18 of the first panel 12 on opposite sides of the opening 16. While the retaining features 32, 33 engage the rim 18 of the first panel 12, the base 22 supports the second panel 14. As a result of the base 22 supporting the second panel 14, the second panel 14 is prevented from flexing toward the first panel 12.

Figure 2:
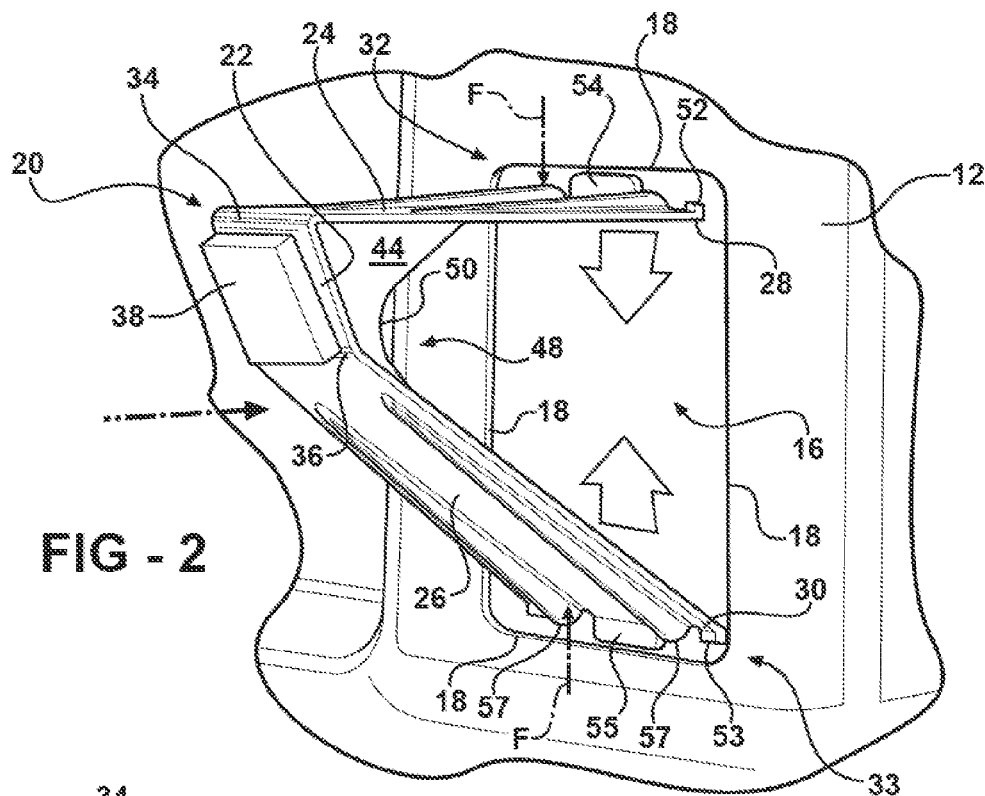
FIG. 2 is a perspective side view of the member partially attached to the first panel.

Referring to FIG. 2, the member 20 is installed to the first panel 12 by inserting the member 20 between the panels 12, 14 and moving the ends 28, 30 of the legs 24, 26 toward one another, as illustrated in FIG. 2. The ends 28, 30, and at least a portion of the legs 24, 26, move toward one another as a result of applying a force F to each of the legs 24, 26. This force F is typically applied by squeezing the legs 24, 26 toward one another. Likewise, because the legs 24, 26 are resilient, the legs 24, 26 move away from one another once the force F applied to the legs 24, 26 is reduced or removed.

The base 22 is a generally planar surface and includes a first side 34 and a second side 36 in spaced relationship to the first side 34, i.e., the sides 34, 36 oppose one another on the base 22. However, it should be appreciated that the base 22 is not limited to being planar, but can be formed with a contour to match a contour corresponding to the second panel 14. The first leg 24 extends from the first side 34 of the base 22 and the second leg 26 extends from the second side 36 of the base 22. In the present embodiment, a pad 38 is disposed on the base 22 for supporting the second panel 14. Referring again to FIG. 1, the pad 38 contacts the second panel 14 to ensure that the member 20 firmly supports the second panel 14 while providing a cushioned support between the member 20 and the second panel 14. The cushioned support prevents read-through of the base 22 on the second panel 14 which may result if the base 22 were to remain directly in contact with the panel 12, 14. Additionally, the pad 38 prevents rattling and other noises which may result from placing the base 22 of the member 20 in direct contact with the second panel 14. A durometer, or hardness, of the material of the pad 38 is selected such that it prevents read-through and rattling between the member 20 and the second panel 14. The pad 38 is compressible and may be formed from neoprene rubber or any other suitable material known to those skilled in the art. Alternatively, the pad 38 may be formed from a mastic material (i.e., expandable foam material) which is applied to the second panel 14 or the base 22 prior to painting the panels 12, 14. Those skilled in the art will recognize a variety of suitable materials for the pad 38 which may be employed within the scope of the claimed invention.

As both legs 24, 26 extend from the base 22, the first leg 24 diverges from the second leg 26. Referring to FIG. 1, the first leg 24 extends from the base 22 at a first angle 40 which is acute with respect to the base 22. The second leg 26 extends from the base 22 at a second angle 42 which is obtuse with respect to the base 22. These angles 40, 42 allow the base 22 to support the second panel 14 when the second panel 14 is not in parallel relationship to the first panel 12. It should be appreciated that the angles 40, 42 are not limited and may be in any desired configuration which allows the base 22 to support the second panel 14.

A web 44 interconnects the first leg 24, the second leg 26, and the base 22. The web 44 increases the force F that is required to move the ends 28, 30 toward one another when attaching the member 20 to the first panel 12. Additionally, the web 44 provides structural stiffness to the member 20 after the member 20 is attached to the first panel 12. This structural stiffness prevents the legs 24, 26 from inadvertently moving toward one another after the member 20 is attached to the first panel 12 when pressure is applied to the second panel 14. The web 44 extends from the base 22, along a portion of each of the legs 24, 26, to a respective terminus 46. This allows only a portion of each of the legs 24, 26, which extend between the terminus 46 and the ends 28, 30, to move toward one another for attaching the member 20 to the first panel 12, while preventing the entire length of each of the legs 24, 26 from moving. The web 44 defines a channel 48 which extends from each terminus 46 to a bottom 50.

Figure 3:
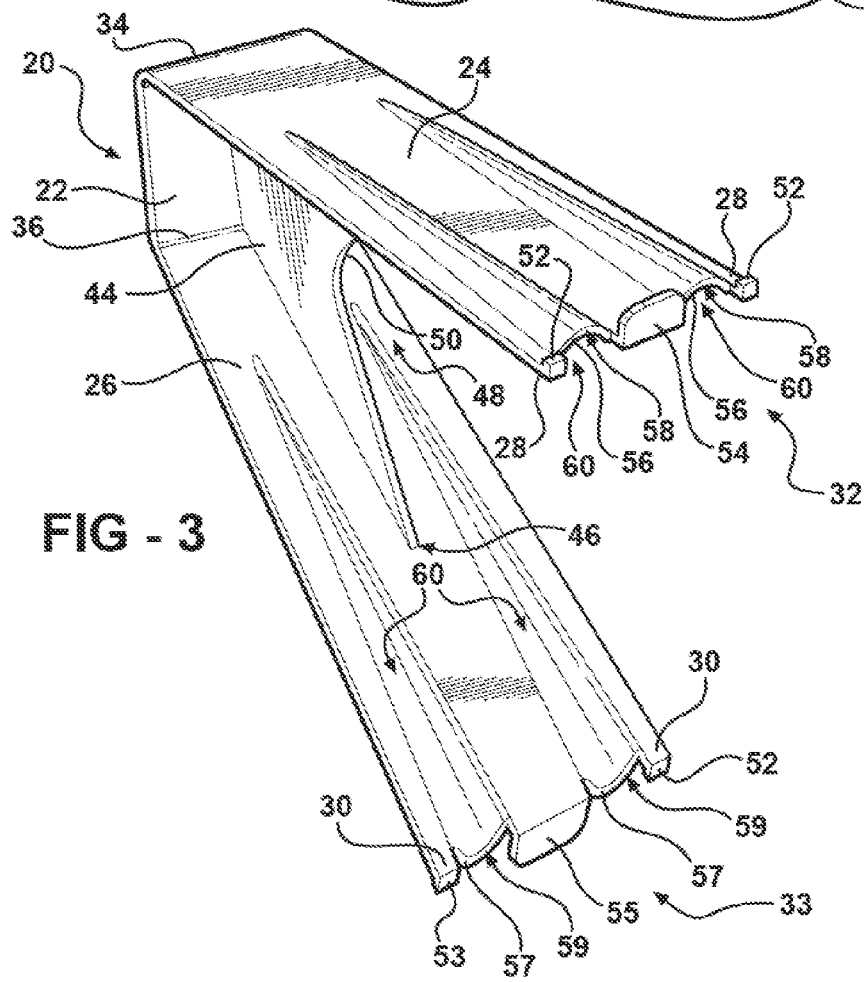
FIG. 3 is a top perspective view of the member.

As described above, the first retaining feature 32 is disposed at the first end 28 and the second retaining feature 33 is disposed at the second end 30. Referring specifically to FIG. 3, the first retaining feature 32 includes a first pair of fingers 52 and a first tab 54, which is disposed between the first pair of fingers 52. The second retaining feature 33 includes a second pair of fingers 53 and a second tab 55, which is disposed between the second pair of fingers 53. The tabs 54, 55 extend in opposing directions from the ends 28, 30 of the legs 24, 26 (i.e., away from one another). Like the tabs 54, each pair of fingers 52 also extend in opposing directions from one another. The first retaining feature 32 includes a pair of first edges 56 and the second retaining feature includes a pair of second edges 57, which are formed at the ends 28, 30 of the respective legs 24, 26. The first pair of edges 56 are formed between the first tab 54 and each of the first pair of fingers 52. The second pair of edges 57 are formed between the second tab and each of the second pair of fingers 53. This means that each leg 24, 26 includes two edges 56, 57. The edges 56, 57 have an arched shape. However, it should be appreciated that more or fewer edges 56, 57 may be used. Additionally, the shape is not limited to being arched and may be any desired shape known to those skilled in the art. The edges 56, 57 arch in opposing directions from one another such that the first pair of edges 56 of the first leg 24 arch, or extend, away from the second pair of edges 57 of the second leg 26. The first edge 56 presents a first surface 58, which opposes the first tab 54 and the first pair of fingers 52. The second pair of edges 57 present a second surface 59, which opposes the second tab 55 and the second pair of fingers 53. The first and second surfaces 58, 59 of the first and second pair of edges 56, 57, the first and second tabs 54, 55, and the first and second pairs of fingers 52, 53 are for engaging the rim 18 of the first panel 12 to retain the member 20 to the first panel 12 when the force F is reduced or removed from the member 20 and the legs 24, 26 have moved back apart.

As illustrated in FIG. 2, the retaining features 32, 33 of the member 20 are attached to the rim 18 of the first panel 12 by applying the force F to each of the legs 24, 26 to move the ends 28, 30 of the legs 24, 26 toward one another. The member 20 is placed between the panels 12, 14 and the base 22 is aligned with the second panel 14 while a portion of the retaining features 32, 33 of the member 20, i.e., the tabs 54, 55 and fingers 52, 53, are placed through the opening 16 in the first panel 12 and aligned with the rim 18 of the first panel 12. After the tabs 54, 55 and the fingers 52, 53 are aligned with the rim 18 of the first panel 12, the force F applied to the legs 24, 26 of the member 20 is reduced, and eventually eliminated, such that the legs 24, 26 move back apart and the tabs 54, 55, the fingers 52, 53 and the edges 56, 57 engage the rim 18, on opposing sides of the first panel 12. This means that the rim 18 of the first panel 12 is sandwiched between the tab 54, 55, the fingers 52, 53, and the edges 56, 57 for each of the legs 24, 26 to retain the member 20 to the first panel 12. In addition to engaging the rim 18 of the first panel 12, the fingers 52, 53 also prevent the member 20 from rotating about the tabs 54, 55 and out of engagement with the rim 18 of the first panel 12.

To provide additional stiffness to the legs 24, 26 of the member 20, each of the legs 24, 26 define one or more arched grooves 60. When the member 20 includes grooves 60, one of the grooves 60 extends from the respective edge 56, 57, along a portion of the leg 24, 26. The grooves 60 taper as the grooves 60 extend along the portion of the respective leg 24, 26.

While the best modes for carrying out the invention have been described in detail, those familiar with the art to which this invention relates will recognize various alternative designs and embodiments for practicing the invention within the scope of the appended claims.

The invention claimed is:

1. A member for supporting a first panel relative to a second panel in a vehicle, said member comprising:

a base for supporting the second panel;

a first leg resiliently extending from said base to a first end;

a second leg resiliently extending in spaced relationship to said first leg from said base to a second end;

a first retaining feature disposed at said first end for engaging the first panel to retain said member to the first panel; and a second retaining feature disposed at said second end for engaging the first panel to retain said member to the first panel;

wherein said ends move toward one another upon application of a force to each of said legs to attach said member to the first panel and said ends move apart as the force is reduced to retain said member to the first panel.

2. A member, as set forth in claim 1, wherein said base includes a generally planar surface and said base includes a first side and a second side in spaced relationship to said first side with said first leg extending from said first side and said second leg extending from said second side.

3. A member, as set forth in claim 2, further comprising a pad disposed on said base for contacting the second panel when said member is attached to the first panel to support the second panel relative to the first panel.

4. A member, as set forth in claim 3, wherein said pad is compressible.

5. A member, as set forth in claim 2, wherein said first and second legs diverge from said base.

6. A member, as set forth in claim 2, wherein said first leg extends from said base at a first angle which is acute.

7. A member, as set forth in claim 6, wherein said second leg extends from said base at a second angle which is obtuse.

8. A member, as set forth in claim 1, further comprising a web interconnecting said first leg and said second leg.

9. A member, as set forth in claim 8, wherein said web interconnects said first leg and said second leg and said base.

10. A member, as set forth in claim 8, wherein said web extends from said base and along a portion of each of said legs to a terminus with each of said termini spaced from said respective end.

11. A member, as set forth in claim 10, wherein said web defines a channel extending from each of said termini to a bottom.

12. A member, as set forth in claim 1, wherein said first retaining feature includes a first tab disposed on said first end and said second retaining feature includes a second tab disposed on said second end; and said first and second tabs extending from said ends in opposing directions from one another for engaging the first panel.

13. A member, as set forth in claim 12, wherein said first retaining feature includes a first pair of fingers with said first tab disposed between said first pair of fingers and said second retaining feature includes a second pair of fingers with said second tab disposed between said second pair of fingers; and said first and second pairs of fingers extending from said ends in opposing directions from one another for engaging the first panel.

14. A member, as set forth in claim 12, wherein said first retaining feature includes a first edge formed on said first end and said second retaining feature includes a second edge formed on said second end with each of said edges having an arched shape and extending in opposing directions from one another for engaging the first panel.

15. A member, as set forth in claim 14, wherein said first leg defines a first groove extending from said first edge along a portion of said first leg and said second leg defines a second groove extending from said second edge along a portion of said second leg.

16. A member, as set forth in claim 15, wherein each of said first and second grooves are tapered along each of said legs.

17. A member, as set forth in claim 15, wherein said first edge is a pair of first edges with said first tab disposed between said pair of first edges and said second edge is a pair of second edges with said second tab disposed between said pair of second edges.

18. A support system for a vehicle body, said support system comprising:

a first panel defining an opening;

said first panel including a rim surrounding said opening;

a second panel in spaced relationship to said first panel; and a member disposed between said panels with said member reacting between said panels, said member including;

a base, a first leg resiliently extending from said base to a first end, a second leg resiliently extending in spaced relationship to said first leg from said base to a second end, and a first retaining feature disposed at said first end;

a second retaining feature disposed at said second end;

wherein each of said first and second retaining features engage said rim of said first panel and said base supports said second panel such that said second panel is prevented from flexing toward said first panel.

19. A method of assembling a body panel of a vehicle, said method comprising the steps of:

applying a force to each of a first leg and a second leg of a member to move retaining features, disposed at ends of the legs, toward one another;

placing the retaining features of the member into an opening defined in a first panel;

aligning the retention features of the member with a rim surrounding the opening of the first panel; and releasing the force on each of the legs such that the retention features engage the rim of the first panel and retain the member to the first panel.

20. A method, as set forth in claim 19, further comprising aligning a base of the member with a second panel to support the second panel relative to the first panel.

* * * * *